United States Patent
Biron

[15] 3,690,534
[45] Sept. 12, 1972

[54] CABLE HANDLING SYSTEM
[72] Inventor: Jules N. Biron, 82903 Sharpview, Houston, Tex. 77036
[22] Filed: Sept. 22, 1969
[21] Appl. No.: 859,641

[52] U.S. Cl..................................226/172, 226/173
[51] Int. Cl. ................................................B65h 17/34
[58] Field of Search .....226/172, 173; 188/72.4, 65.1

[56] References Cited

UNITED STATES PATENTS

| | | | |
|---|---|---|---|
| 2,892,535 | 6/1959 | Cullen | 226/173 |
| 3,351,034 | 11/1967 | Grek | 226/173 X |
| 2,711,802 | 6/1955 | Davis | 188/72.4 |
| 2,792,930 | 5/1957 | Graham | 226/172 |

Primary Examiner—Richard A. Schacher
Attorney—J. Vincent Martin, Joe E. Edwards and Jack R. Springgate

[57] ABSTRACT

A cable handling system including an endless chain with cable gripping members mounted thereon, a cam to engage and maintain the engagement of the gripping members with a cable, and release them from engagement with a cable, a drive for the endless chain, a brake and a cable storage bin.

13 Claims, 11 Drawing Figures

INVENTOR.
JULES N. BIRON

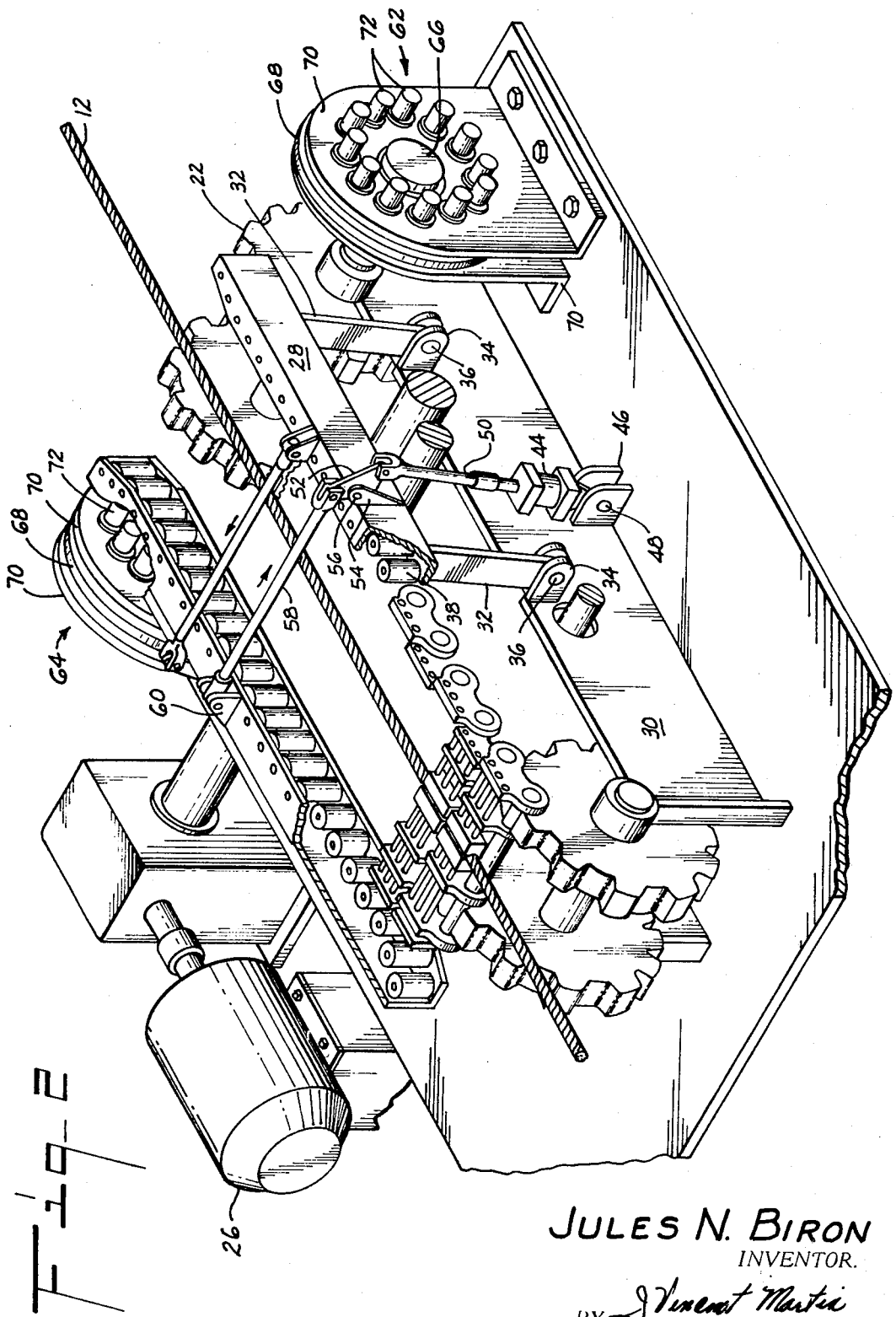

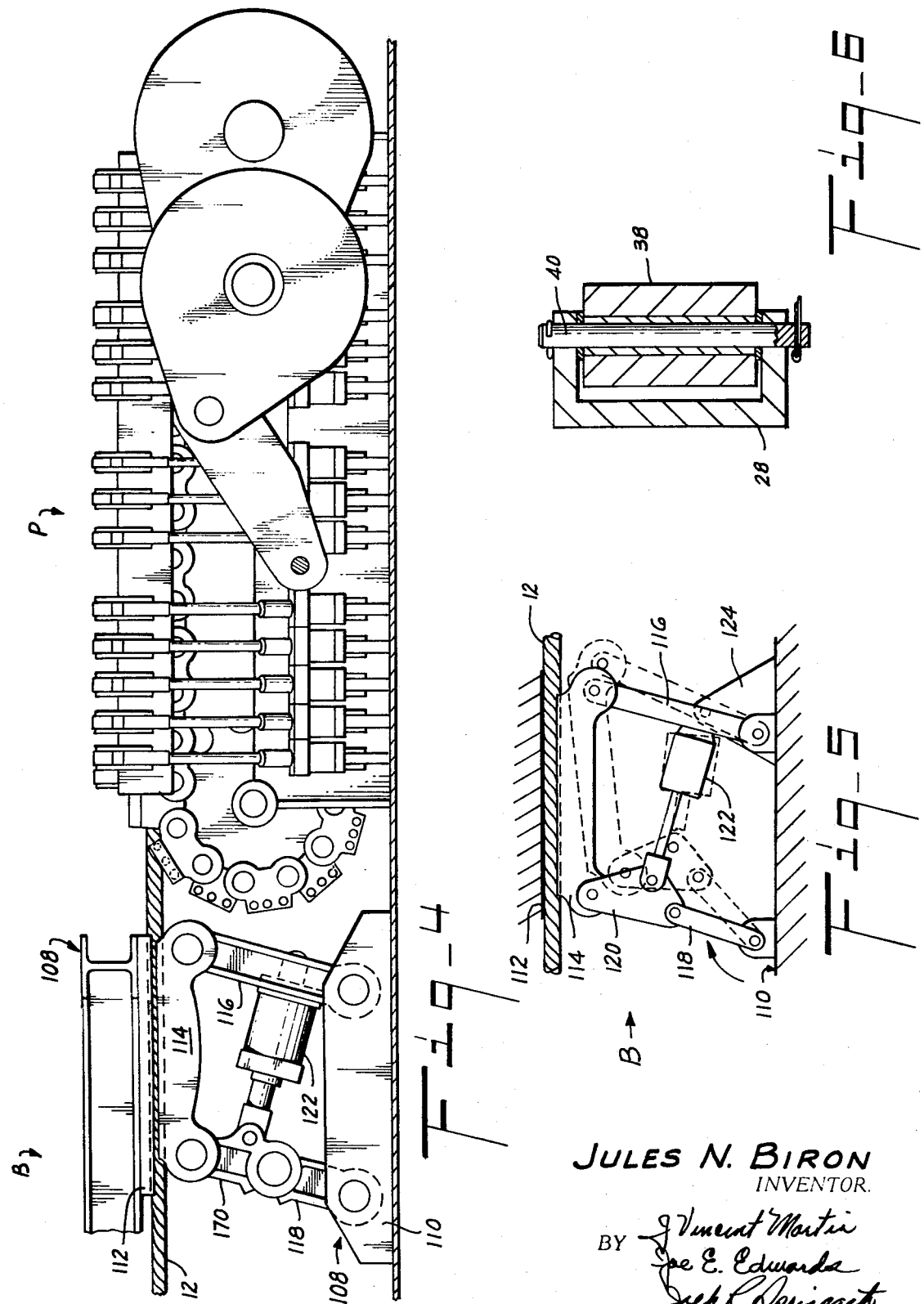

JULES N. BIRON
INVENTOR.

BY Vincent Martin
Joe E. Edwards
Jack L. Springgate
ATTORNEYS

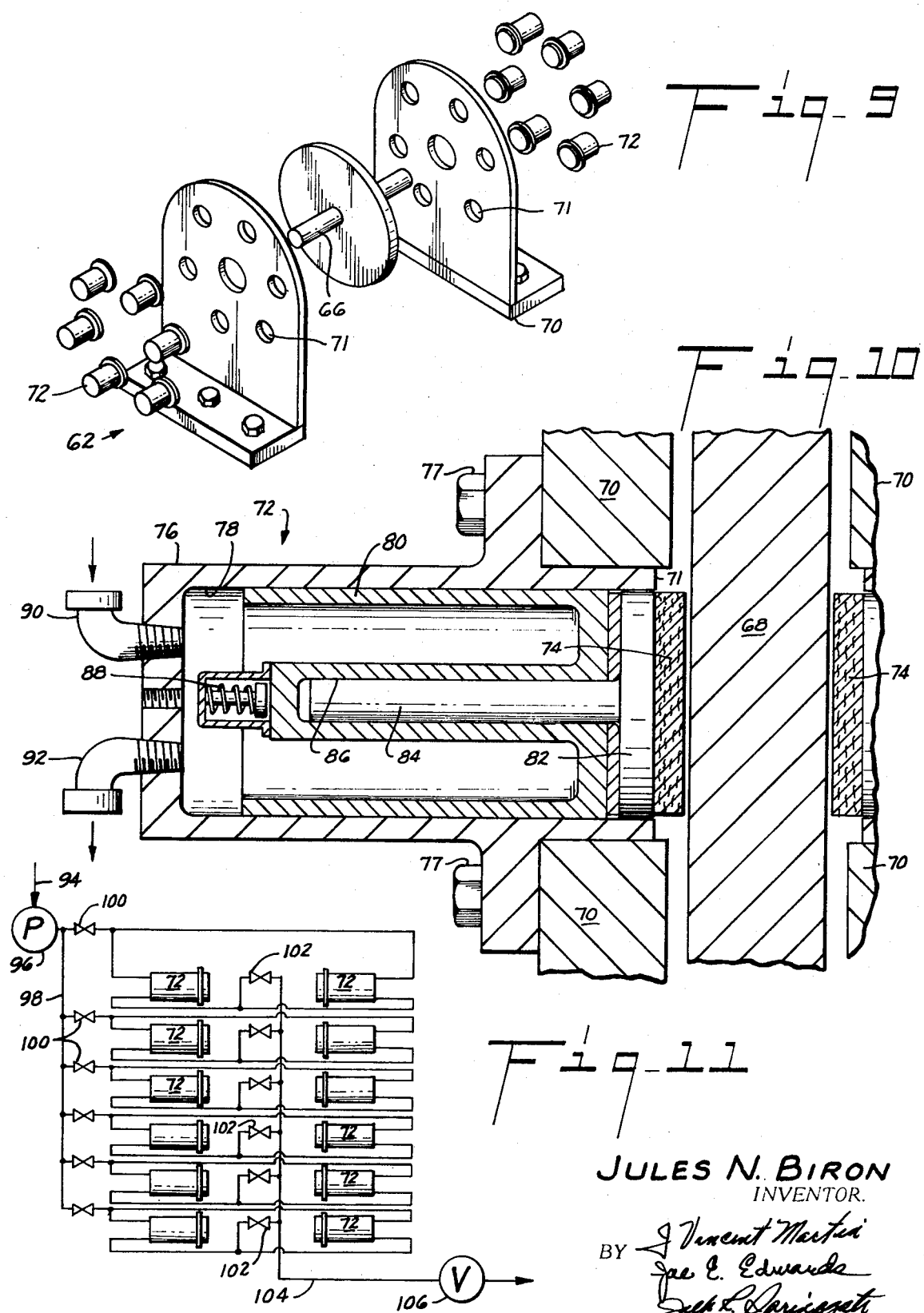

3,690,534

CABLE HANDLING SYSTEM

SUMMARY

The present invention relates to an improved cable handling system for holding, pulling and paying out cable.

An object of the present invention is to provide an improved cable handling system for exerting a continuous pull on a cable.

Another object is to provide an improved cable handling system which can positively move a cable in either direction with at least two different speeds.

A further object is to provide an improved cable handling system with a stopper brake having a wedging action for holding cable which stopper brake can be positively released.

Still another object is to provide an improved cable pulling device with an improved fluid operated balanced service brake.

A still further object is to provide as a subcombination in a cable handling system, an improved cable stopper brake which tightens its grip on a cable responsive to the tension on the cable and is easily, quickly and positively released.

BRIEF DESCRIPTION OF THE DRAWINGS

These and other objects and advantages are hereinafter described and explained with reference to the apparatus shown in the drawings wherein:

FIG. 2 is a partial perspective view of the improved cable pulling device of the present invention.

FIG. 4 is a side elevation of the cable pulling device and cable stopper brake.

FIG. 5 is a schematic elevation view of the cable stopper brake showing its engaged and released positions.

FIG. 6 is a typical sectional view of the cam roller which transmits the force for the gripping engagement of a cable by the cable puller.

FIG. 9 is an exploded view of the cable pulling service brake.

FIG. 10 is a detailed sectional view of one of the braking cylinders of the cable pulling service brake.

FIG. 11 is a flow diagram showing the fluid system of the cable pulling brake.

DESCRIPTION OF THE PREFERRED EMBODIMENTS

Figure 1:
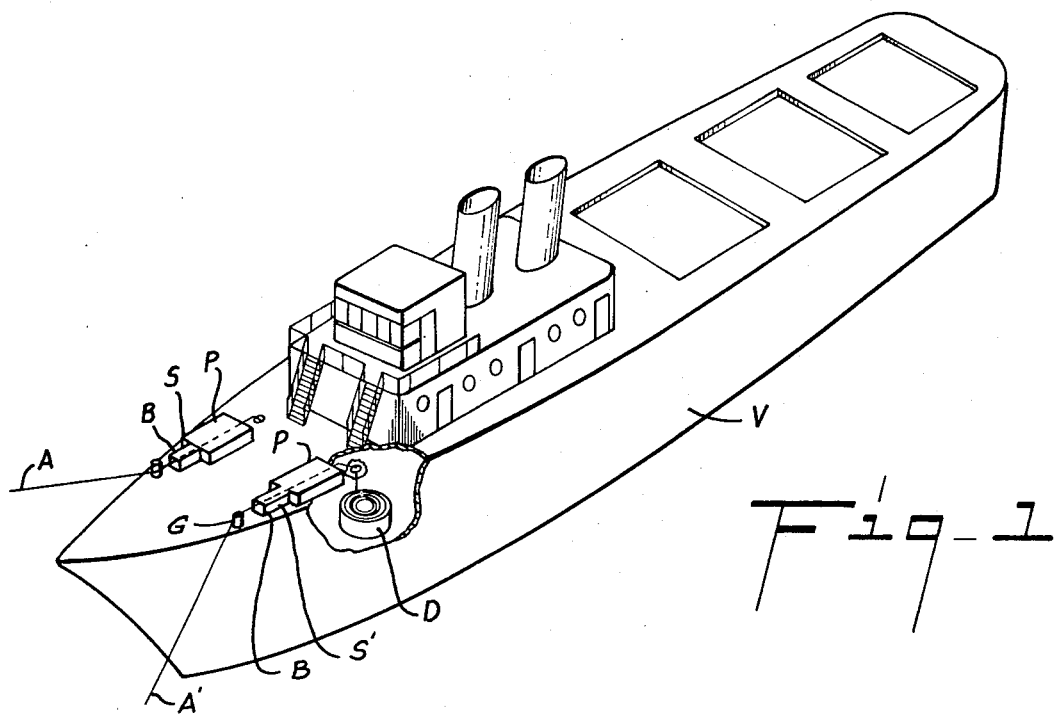
FIG. 1 is a view of a vessel with two of the improved cable handling systems of the present invention shown schematically.

The improved cable handling system of the present invention is illustrated in FIG. 1 handling cables such as, anchor cables on a vessel. This system can be used also for vessel mooring or any other use in which it is desired to pull, hold and pay-out cable. The vessel V includes the two anchoring cables A and A' which are controlled by the two cable handling systems S and S'. Each of the cable handling systems includes a cable puller P, a cable brake B, a cable storage drum or bin D and a suitable cable guide G.

Figure 3:
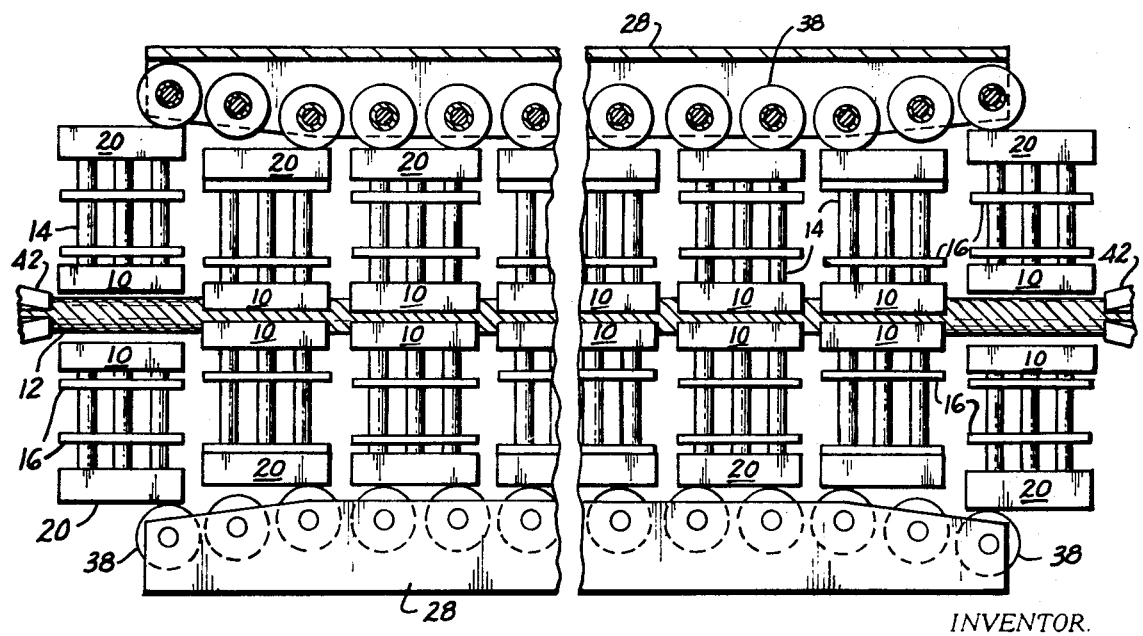
FIG. 3 is a partial plan view of the cable pulling device.
Figure 7:
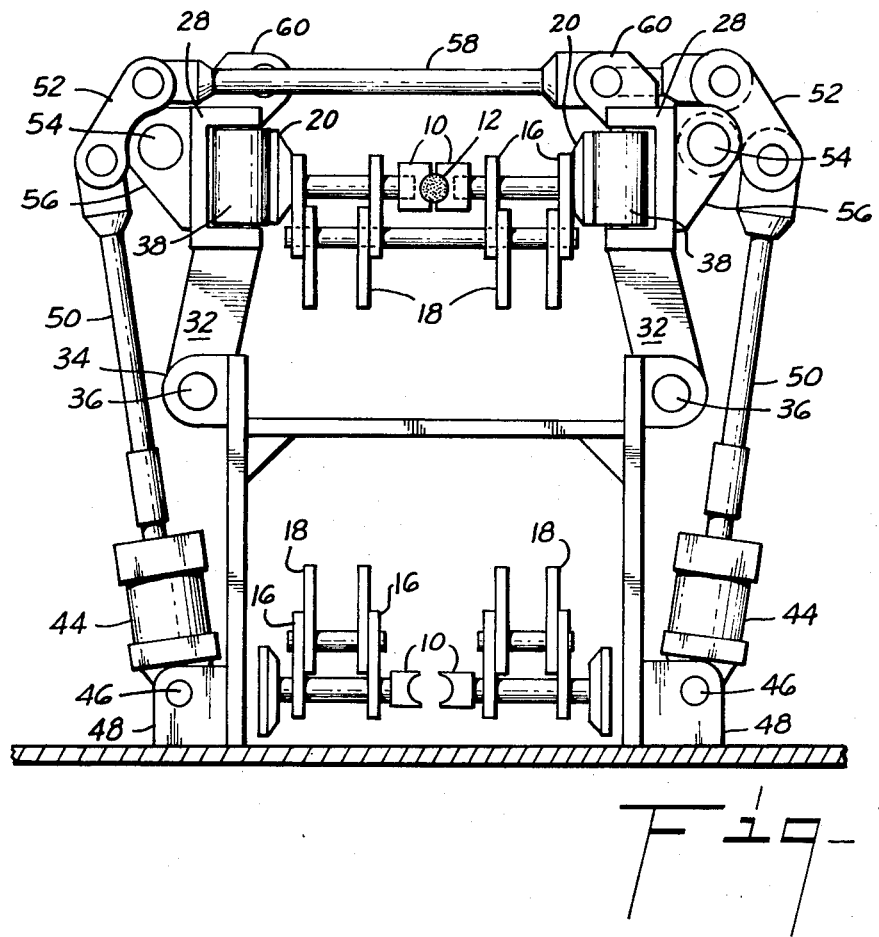
FIG. 7 is an end elevation view of the cable pulling device to show the mounting of the roller cams and the actuators which provide the force for gripping engagement of a cable by the cable puller.

The details of the improved cable puller P are shown in FIGS. 2, 3 and 4. In general, the cable puller P includes a plurality of pairs of opposed gripping shoes 10, means for moving the gripping shoes 10 into and out of engagement with the cable 12 and the driving means for moving the gripping shoes and the cable. The driving means preferably provides for a moderate and a rapid rate of cable movement in both directions. Each of the gripping shoes 10 is slidably mounted on the inner end of the bars 14. The bars 14 extend through holes in the links 16 of endless chain 18 so that each shoe 10 may be moved toward and away from its opposing shoe for engagement with and disengagement from the cable 12. The plates 20 are secured to the outer end of bars 14 to provide a surface for the application of gripping force which is transmitted to the shoes 10. The chains 18 are mounted around the sprockets 22 and 24.

The power for driving the cable 12 is provided by the motor 26 which is connected through suitable gearing, a clutch and belts to the shaft of sprocket 22 to rotate the sprocket 22 about its shaft in both directions and preferably at least two rates of speed in each direction. With the moving power being supplied to the sprocket 22, the sprocket 24 is mounted on its shaft as an idler. Thus, the chains 18 can be driven in both directions and at varying speeds for the controlled movement of the cable 12.

In order to move the cable 12 with the movement of the chains 18, the gripping shoes 10 engage the cable after leaving one of the sprockets and maintain such engagement until they reach a position approaching the other of the sprockets. A cam means is provided to move the shoes 10 into and out of gripping engagement. The cam means coacts with the plates 20 to force each pair of shoes 10 toward each other with sufficient force to provide a driving engagement of the cable between the shoes. Also, the cam means is provided with a force applying means which assures that responsive to the coaction between the cam means and the plates 20 sufficient forces are developed urging the shoes 10 together on the cable 12 to assure a driving engagement of the cable even when it is heavily loaded.

The cam means as best shown in FIGS. 2, 3, 7 and 8 includes the two channels 28 pivotally mounted to the frame 30 in parallel relation with and adjacent the sides of the upper runs of the chain 18. The arms 32 are secured to the channels 28 and are pivotally connected to the lugs 34 on the frame 30 by the pins 36. A plurality of rollers 38 are mounted within each of the channels 28. The rollers 38 are free to rotate when they are engaged by the plates 20. The mounting of each of the rollers 38 as shown in FIG. 6 is provided by the pin 40 which extends across legs of channel 28 and includes suitable bushing or bearings to assure that the rollers 38 are free to turn at all times and a means for retaining the pins 40 in their desired position. A means such as keys 41 are provided to retain pins 40 in position.

The cam function of the cam means is provided by the relative positioning of the rollers 38 in the channels 28. As best seen in FIG. 3, the rollers 38 at the ends of the channels 28 are positioned farthest from the chains 18 and the next two rollers inward at each end of the channel are closer to the chains than the end rollers. The rollers 38 thus form a cam means which moves the shoes 10 toward gripping engagement as the plates 20 initially encounter the rollers 38 and the central rollers 38 hold the shoes in engagement with the cable while the rollers 38 at the other end relax the inward force on the shoes 10 and allow the shoes to be moved out of engagement with the cable 12. It is preferred that the size and spacing of rollers 38 and the size of plates 20 be preselected so that the plate 20 is always in engagement with at least one of the rollers while it is passing by such cam means. If desired, a suitable means such as the wedges 42 may be provided at each end of the cable puller to engage the shoes 10 and cam them apart. It is preferred that such means also assure that the shoes are spaced sufficiently apart to receive the cable 12 as they approach initial engagement.

Figure 8:
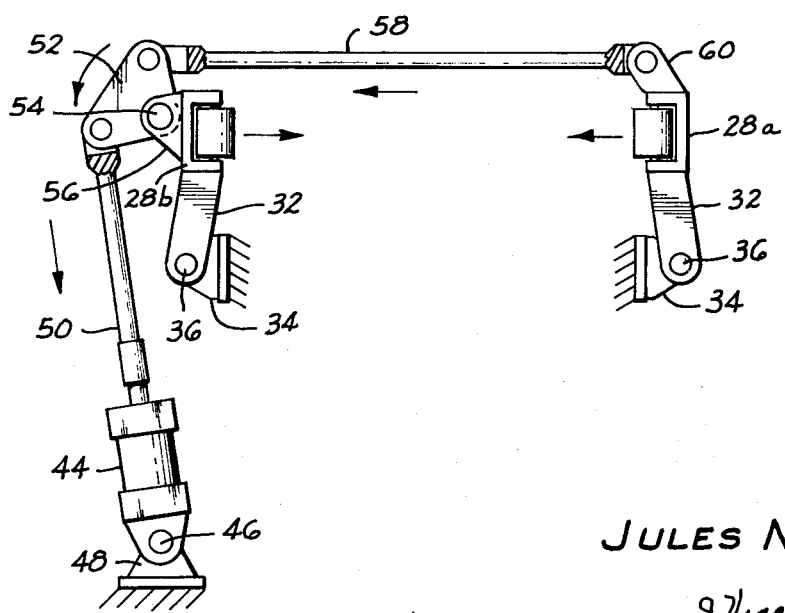
FIG. 8 is a schematic diagram to illustrate the transmission of the force of the actuators to the cam rollers.

Since considerable forces are to be developed in the cam means to assure a driving engagement with the cable 12, such force is provided by a force applying means. The actuators 44 of the force applying means are connected to the frame 30 by the pins 46 and the lugs 48. The extendible arms 50 of actuators 44 connect to bell cranks 52 which are pivotally mounted to the backs of the webs of channels 28 by the pins 54 and the lugs 56. The tension arm 58 is connected between the bell crank 52 on one of the channels 28 and the lugs 60 on the opposite of the channels 28. The manner in which the force applying means provides the force for the driving engagement of the cable 12 by the shoes 10 is best illustrated in FIG. 8. As shown, the retraction of the arm 50 by the actuator 44 produces a counter-clockwise moment in the bell crank 52. This pulls on arm 58 to urge the channel 28(a) on the right side toward the left or inwardly to provide an inward force on the plates 20 in engagement with the rollers 38 of such channel. Also, the reaction on the bell crank 52 provides an inwardly directed force on the left side channel 28(b) to urge the plates 20 in engagement with its rollers 38 inwardly. By providing a plurality of such actuators and alternating the side on which they are mounted as seen in FIG. 4, sufficient forces for the driving engagement of the cables 12 are provided to the shoes 10 through the cam means. Also, when desired, the force applying means may be relaxed by extending the arms 50 to decrease or release the forces exerted by the shoes 10 on the cable 12.

In addition to the cable brake B, hereinafter described, the cable puller P is provided with braking systems 62 and 64 mounted on the opposite ends of the shaft 66 of sprocket 22 as shown in FIG. 2. Each of these braking systems 62 and 64 includes the disc 68 secured to shaft 66 for rotation therewith and the fixed plates 70 which are suitably secured such as to the deck of the vessel or to the foundation on which the cable puller is mounted and such plates 70 extend in parallel relation on opposite sides of the disc 68.

To provide the braking of the shaft 66, a plurality of pairs of brakes 72 mounted in the plates 70 have shoes 74 which are adapted to engage the disc 68. This braking system 62 is shown in detail in FIGS. 9, 10 and 11. The brakes include the housing 76 having a central bore 78 in which the cup 80 is slidably positioned. The housings 76 are secured in the openings 71 in the plates 70 by the bolts 77 as shown. The shoe 74 is bonded to the plate 82 which has its shaft 84 positioned in the recess 86 defined in the cup 80. The cup 80 is biased away from the disc 68 by the spring 88. The brake 72 is designed to be operated responsive to fluid pressure and is therefore provided with the inlet 90 and the outlet 94 communicating with the interior of housing 76. By having both an inlet and an outlet, a fluid such as hydraulic fluid may be circulated through the brake 72 continuously to provide cooling of the brake 72 and thereby increase the effective life of the brake shoes 74. Spring 88 provides sufficient force to prevent the pressure of the fluid being circulated for cooling from causing a braking action.

It is advantageous to mount each pair of brakes 72 in axial alignment with each other and on opposite sides of disc 68 and to operate each pair together so that the forces exerted by each pair of brake shoes on the disc 68 are substantially balanced. In addition to minimizing the strain on the disc 68, the balancing assures a more positive and uniform braking. The fluid system for the operation of the brakes 72 in pairs as described is shown in FIG. 11. Such system provides a supply of hydraulic fluid to the inlet 94 of the pump 96. The pump discharge is supplied to the manifold 98. Communication is provided from the manifold 98 through one of the shut-off valves 100 to the inlets 90 of each pair of brakes 72. Communication is also provided from the outlets 92 of each pair of brakes 72 through one of the shut-off valves 102 to the discharge manifold 104. Control valve 106 is positioned in the discharge manifold 104. From valve 106, the fluid is conducted to a suitable reservoir (not shown) which may supply the fluid to pump 96. With the system as shown any pair of brakes 72 may be isolated from the system by closing the valves 100 and 102 in the communications to and from such pair of brakes. With a pair of brakes 72 isolated, they may be removed and faulty or worn parts replaced without having to shut down the cable puller P. The increase in fluid pressure for a braking action may be provided by an increase in the output of the pump 96 or by providing a restriction in the discharge manifold by partially closing valve 106.

Thus, whenever it is desired to slow the movement of the cable 12, through the cable puller P, the pressure of the fluid in the brakes 72 is increased. This causes the cup 80 to move against the bias of spring 88 to force the shoes 74 into braking engagement with disc 68. This braking may be used to control the rate of movement of the cable 12 through the cable puller P when it is being pulled by a force other than the force of the cable puller.

Additionally, the cable brake B is provided preferably for securing the cable 12 against movement when it is to be held. The cable brake B as best shown in FIGS. 4 and 5 includes a frame 108, the base portion 110 of which is secured to the deck of the vessel V and the other portion of which is spaced therefrom and provides the reaction plate 112 which coacts with the brake shoe 114 for engagement of the cable 12. One end of the brake shoe 114 is connected by the link 116 to the base 110 and the other end thereof is connected to the base 110 by the link 118 and the bell crank 120. The actuator 122 connects from the lug 124 secured to the base 110 to the bell crank 120. The extension of actuator 122 causes the rotation of bell crank 120 to force the shoe 114 into engagement with the cable 12.

The operation of the cable brake B is shown in FIG. 5 wherein it is shown in its braking position in solid lines and in its released or relaxed position in dashed lines. The distance between base 110 and reaction plate 112 is preselected so that the link 116 does not approach a perpendicular relationship with either base 110 or plate 112. This allows the brake B to be somewhat responsive to the pull of the cable 12 and to be wedged into locked position whenever brake shoe 114 engages the cable 12 as it is moving to the left in FIGS. 4 and 5. Also, as shown in the drawings the point of pivotal connection between link 118 and bell crank 120 is prevented from moving through an imaginary line drawn from the point of connection of link 118 to base 110 and the point of connection of bell crank 120 to shoe 114. This prevents the combined linkage from moving "past center". If the linkage were allowed to move past center then the initial releasing movement of actuator 122 would tighten the engagement of brake shoe 114 against cable 12. This would cause wedging of the brake and cable and lock the cable in the brake. The improved brake, however, takes advantage of the wedging action while assuring that the brake cannot become locked in its engaged position since the initial retraction of actuator 122 causes the brake shoe 114 to move away from cable 12.

The cable brake B is preferably mounted in alignment with the cable puller P as shown in FIG. 4. In this position, whenever it is desired to retain the cable 12 against movement, the cable brake B can be set by actuation of actuator 122 and then the cable puller P may be shut-off, that is, the means providing the engaging force may be relaxed.

By threading the cable 12 through the cable handling system of the present invention, the cable may be moved in either direction with at least two speeds. Thus, when the cable is attached to an anchor it may be rapidly paid out and when the anchor is set, the cable may be tightened by movement in the opposite direction at a substantially reduced rate. The dual braking system provides a degree of flexibility such that when braking is desired, either one or both of the braking systems may be used. When it is desired to take advantage of the tension in the cable 12, the cable brake B would be used. When such reaction responsive to cable tension is not desired, the braking systems 62 and 64 would be used. In cases of emergency of high loading, both systems could be used.

From the foregoing it can be seen that the improved cable handling system of the present invention provides for dual speed in the movement of the cable in both directions and provides a cable brake which can use the tension or pull in the cable to tighten or increase its braking action without becoming locked on the cable. The improved cable puller continuously moves a cable in either direction and is provided with an improved integral braking system for controlling cable movement.

What is claimed is:

1. A cable handling system, comprising
   a pair of endless chains,
   a pair of sprockets,
   said chains being mounted around said sprockets in parallel side-by-side relationship to each other,
   a plurality of cable gripping members,
   means for movably mounting said cable gripping members on said chains with each member mounted on one chain having a complementary and opposed member mounted on the other chain whereby said opposed members may engage and disengage from a cable,
   a pair of cams movably mounted with respect to said chains,
   means for moving and maintaining said cams in a preselected position,
   said cable gripping members including means for engaging said cams,
   said cams co-acting with said engaging means to move said cable gripping members into gripping position and to retain said cable gripping members in gripping position during a preselected length the travel of said gripping members along one portion of each of said chains when said cams are in said preselected position, and
   driving means connected to one of said sprockets to move said chain in both directions.

2. A cable handling system according to claim 1, including
   brake means connected to brake one of said sprocket shafts against rotation.

3. A cable handling system according to claim 2, wherein said brake means includes
   a pair of parallel fixed plates,
   a disc secured for rotation with the shaft of one of said sprockets and positioned between said fixed plates,
   a plurality of braking cylinders mounted in said fixed plates with each of said braking cylinders having a brake shoe adapted to be moved into engagement with said disc, and
   means for supplying fluid pressure to said braking cylinders.

4. A cable handling system according to claim 3, wherein
   said braking cylinders mounted in each of said fixed plates being opposite to a braking cylinder mounted in the other of said fixed plates whereby the opposed brake shoes provide the reaction force for each other to prevent an unbalance of forces on said disc.

5. A cable system according to claim 4, including
   a fluid flow inlet manifold connecting to each of said braking cylinders,
   a fluid flow outlet manifold connecting from each of said braking cylinders, and
   means for isolating each opposed pair of braking cylinders from said manifolds independent of the other said braking cylinders.

6. A cable system according to claim 3, including
   means for biasing each of said brake shoes away from engagement with said disc,
   said fluid supply means continuously flowing fluid to and from said braking cylinders under a pressure less than the pressure which overcomes the force of said biasing means, and
   means in said fluid supply means for increasing the fluid pressure within said braking cylinders to actuate said brake means.

7. A cable handling system according to claim 1, wherein said actuating means includes cam means adapted to urge said gripping members into gripping engagement with a cable.

8. A cable handling system, comprising a pair of endless chains, a pair of sprockets, said chains being mounted around said sprockets in parallel relationship to each other, a plurality of cable gripping members, means for movably mounting said cable gripping members on said chains with each member mounted on one chain having a complementary and opposed member mounted on the other chain whereby said opposed members may engage and disengage from a cable, actuating means for moving said opposed cable gripping members toward each other with sufficient force to grip a cable, said mounting and actuating means including rods slidably extending through links in said chain and being secured at their inner ends to said gripping members, plates secured to the outer ends of said rods, and a plurality of rollers positioned to engage said plates to move and hold said gripping members in engagement with the cable, and driving means connected to one of said sprockets to move said chain in both directions.

9. A cable handling system, comprising a pair of endless chains, a pair of sprockets, said chains being mounted around said sprockets in parallel relationship to each other, a plurality of cable gripping members, means for movably mounting said cable gripping members on said chains with each member mounted on one chain having a complementary and opposed member mounted on the other chain whereby said opposed members may engage and disengage from a cable, actuating means for moving said opposed cable gripping members toward each other with sufficient force to grip a cable, driving means connected to one of said sprockets to move said chain in both directions, brake means connected to brake one of said sprockets against rotation, said brake means including a frame including a base and a reaction plate being generally in parallel to each other, a brake shoe, means for mounting said brake shoe for movement toward and away from said reaction plate, an actuator, said actuator connected to said mounting means to move said brake shoe into engagement with the cable between the reaction plate and the brake shoe, said actuator being so connected that it also positively moves said brake shoe away from said reaction plate independent of the directional pull of the cable engaged between said brake shoe and said reaction plate.

10. A cable handling system, comprising a pair of endless chains, a pair of sprockets, said chains being mounted around said sprockets in parallel relationship to each other, a plurality of cable gripping members, means for movably mounting said cable gripping members on said chains with each member mounted on one chain having a complementary and opposed member mounted on the other chain whereby said opposed members may engage and disengage from a cable, actuating means for moving said opposed cable gripping members toward each other with sufficient force to grip a cable, driving means connected to one of said sprockets to move a chain in both directions, a brake frame including a base and a reaction plate being generally parallel to each other, a brake shoe, means for mounting said brake shoe for movement toward and away from said reaction plate, an actuator, said actuator connected to said mounting means to move said brake shoe into engagement with a cable between the reaction plate and the brake shoe, said actuator being so connected that it also positively moves said brake shoe away from said reaction plate independent of the directional pull of the cable engaged between said brake shoe and said reaction plate.

11. The system according to claim 10, wherein said brake shoe mounting means includes a first link pivotally connected at its two ends to said base and said brake shoe respectively, a double link being pivoted intermediate its ends and pivotally connected at its two ends to said base and said brake shoe respectively at positions spaced from said first link connections, said actuator being mounted between said base and an intermediate position of said double link whereby actuation of said actuator in one direction moves said double link toward a straight position to set said brake into braking engagement and in the other direction bends said double link to release said brake shoe from breaking engagement.

12. The system according to claim 11, wherein said actuator travel is limited to prevent complete straightening of said double link.

13. The system according to claim 10, wherein said brake shoe when set is held in tight engagement responsive to pull in one direction by said cable until said actuator positively releases said brake shoe from its braking engagement of the cable.

* * * * *